United States Patent Office 3,730,852

Patented May 1, 1973

3,730,852

MANUFACTURE OF ABRASION-RESISTANT MAGNETIC RECORDING MEDIA

Adolf Diebold, Ludwigshafen, Richard Sinn, Ziegelhausen, and Georg Schnell, Ludwigshafen, Germany, assignors to Badische Anilin- & Soda-Fabrik Aktiengesellschaft, Ludwigshafen am Rhine, Germany No Drawing. Filed Nov. 9, 1971, Ser. No. 197,152

Int. Cl. C23f *17/00, 5/32, 5/26*

U.S. Cl. 204—38 B 7 Claims

ABSTRACT OF THE DISCLOSURE

The invention relates to a process for the manufacture of magnetic recording media having thin metallic ferromagnetic coatings.

The magnetic recording media are manufactured by treating a substrate having a coating consisting of a dispersion of particulate iron or zinc in a binder such that electroless deposition of copper takes place by displacement of the iron or zinc, which copper coating may be thickened by electrodepositing copper or silver thereon. A ferromagnetic coating consisting of cobalt and nickel and additionally phosphorus, copper or zinc and/or manganese and optionally iron is electrodeposited on the copper layer.

The process of the invention produces magnetic recording media with thin metallic coatings of high abrasion resistance which cause minimum head wear and have a high storage capacity.

This invention relates to a process for the manufacture of abrasion-resistant magnetic recording media by depositing a thin magnetizable metal layer based on cobalt and nickel on a substrate.

It is known to manufacture magnetic recording media having thin films of magnetizable metals of Group VIII of the Periodic Table or films of alloys of such metals, it being possible to use various bases such as films, drums or discs. Such metal-plated magnetic recording media are distinguished from the usual iron oxide recording media by their higher storage capacity and are used, for example, as memories in electronic data processing equipment.

It is known to make such metal-plated magnetic recording tapes by vaporizing metals in vacuo or by decomposing appropriate metal compounds. It is also known to deposit the thin ferromagnetic metal coating by precipitating magnetizable metals such as cobalt or cobalt alloys onto suitably pretreated substrates by chemical reduction processes. German printed application No. 1,229,307 discloses a method of making magnetic recording media with a magnetic layer of high coercive force by first applying to a dielectric base a thin layer of a metal such as nickel, gold, aluminum, chromium, copper or silver by vacuum evaporation, cathode sputtering, chemical vapor deposition or electroplating and then depositing a thin layer of magentizable metal as the magnetic coating.

However, the prior art metal-plated recording media do not adequately meet the requirements placed on them under field operating conditions as regards their mechanical strength: they must not exhibit any appreciable abrasion of the magnetic layer or cause head wear even after passing the head a large number of times at the usually very high speeds used for reading signals, as such abrasion is detrimental, particularly in the case of recordings of very short wavelength.

It is an object of the present invention to produce improved magnetic recording media having thin ferromagnetic metallic coatings which exhibit particularly good abrasion resistance and cause minimum head wear whilst having a high storage capacity.

We have found that this object is achieved and the production of improved magnetic recording media showing very good abrasion resistance by depositing a thin magnetizable metal layer based on cobalt and nickel on a thin metallic interlayer which has been applied to a flexible non-magnetizable substrate can be advantageously carried out by taking a substrate which has been provided with an adherent coating consisting of a dispersion of finely divided iron or zinc having a mean particle size of from 0.1 to 2$\mu$ in a binder, in which the metal content is at least 50% by weight, and treating said coated substrate, if desired after calendering the coating, in an acidic aqueous copper salt bath so as to effect electroless deposition of copper in exchange for the iron or zinc, optionally thickening the resulting copper layer by electrodeposition of copper or silver, calendering said optionally thickened copper layer to obtain a metal surface having a low degree of surface roughness, and electrolytically depositing on said calendered metallic layer by means of insoluble anodes a thin magnetic layer comprising a magnetizable alloy consisting of from 90 to 20% by weight of cobalt and from 10 to 80% by weight of nickel and containing, based on the total weight of cobalt and nickel, from 0.05 to 2% by weight of copper or from 0.05 to 5% by wegiht of zinc and/or manganese, from 0.1 to 1.5% by weight of phosphorus and 0 to 10% by weight of iron.

Accordingly, the process of the invention starts from a non-magnetizable, preferably flexible substrate, such as polyester or polyvinyl chloride film in the usual thicknesses (in general from 10 to 50$\mu$ or from other substrates of non-magnetizable material, which substrates have on one or both sides a coating consisting of a dispersion of finely divided iron or zinc having an average particle size of from 0.1 to 2$\mu$ in a binder. The metal content of the applied coating is at least 50% by weight and preferably from 65 to 80% by weight of the coating, which, when dry, generally has a thickness of from 2 to 6$\mu$, preferably from 3 to 5$\mu$. The preferred metal for use in this coating is finely divided iron and preferably iron having an average particle size of from 0.1 to 0.9$\mu$. In the preparation of the dispersion of metal particles in the binder before application of the coatings, it has been found advantageous to add not only inert solvents for the binder or binder components to achieve a readily pourable or brushable consistency of the dispersion but also small amounts of emulsifiers, particularly stearic acid or stearic salts. Suitable binders for the dispersion are conventional surface coating binders, provided they exhibit adequate binding properties and adhere adequately to the non-magnetizable substrate. Suitable binders are polymers and copolymers of vinyl chloride or vinylidene chloride, of acrylic acid or methacrylic acid esters with aliphatic alcohols of from 1 to 12 carbon atoms, of vinyl esters of aliphatic monocarboxylic acids of from 2 to 11 carbon atoms, preferably with the addition of polyisocyanates, and, in particular, the well-known surface coatings based on polyisocyanates and low or high molecular weight hydroxy compounds such as hydroxy-containing vinyl copolymers, hydroxy-containing polyesters or polyethers (see Saunders-Frisch, "Polyurethanes, Chemistry and Technology," Part II, Chapter 10).

The surface of the dried coating is advantageously calendered, for example by passing the coated substrate under pressure between one or more pairs of rollers, both made of steel or one of steel and the other of polyamide or one of steel and the other of paper. The peak-to-valley depth of the coating, as measured in a Perthometer (manufactured by Dr. Ing. Perther, Hanover, Germany), can be reduced to about one-quarter to one-fifth of the original value by this method.

In the manufacture of magnetic recording media according to the invention, the substrate provided with the above-described coating is treated in an acidic aqueous copper salt bath such that the electroless deposition of a thin layer of copper in exchange for the iron or zinc in the coating occurs, the thickness of said copper layer (metallic interlayer) on the surface of said coating being in general from 0.05 to 1$\mu$. Preferably, the total amount of iron or zinc in the coating is exchanged for copper. In this electroless copper-plating process the pH of the acidic aqueous copper salt solution is conveniently kept below 2. Advantageously, compounds forming copper complexes are added to the copper salt solution in small quantities, as are also in particular, polycarboxylic acids such as tartaric acid and citric acid, and/or aminocarboxylic acids such as nitrilotriacetic acid, ethylenediaminotetracetic acid, dimethylaminoacetic acid and the alkali salts thereof. In an advantageous continuous embodiment of the invention the coated base film is passed slowly over rollers through an acidic aqueous copper salt bath, on leaving which it passes between pairs of rolls to smooth the surface of the resulting copper interlayer while the latter is still moist. The resulting copper interlayer generally has an electrical resistance of from 0.05 to 0.5 ohm/cm., particularly from 0.05 to 0.2 ohm/cm., as measured on a specimen having a width of 6.25 mm. at an electrode spacing of 10 cm. The calendered copper interlayer has a peak-to-valley depth of about 0.1$\mu$ or less, the two rolls used for calendering in the various tests usually being both made of steel (highly polished) or one of steel and the other of polyamide.

It is frequently advantageous to increase the thickness of the said copper interlayer by electrolytically depositing silver or, preferably, copper in known manner, the resulting thickened interlayer generally being from 0.5 to 1.5$\mu$ thicker than the copper interlayer produced by electroless deposition. It is possible and advantageous to calender the thickened metallic interlayer.

According to the process of the invention, there is then electrolytically deposited on the calendered metallic interlayer, using insoluble anodes, preferably anodes of platinum or platinum/rhodium, a thin magnetic layer comprising about 90 to 20%, in particular from 75 to 40%, by weight of cobalt and from about 10 to 80%, in particular from 25 to 60%, by weight of nickel and containing, based on the total weight of cobalt and nickel, from 0.05 to 2%, in particular from 0.3 to 1.2%, by weight of copper or from 0.05 to 5%, in particular from 0.1 to 1%, by weight of zinc and/or manganese, from 0.1 to 1.5%, in particular from 0.4 to 0.99%, by weight of phosphorus and 0 to 10%, advantageously from 1 to 10%, preferably from 2 to 4%, by weight of iron. In general, the magnetic coatings are deposited in a thickness of from 0.05 to 1.5$\mu$, in particular from 0.1 to 1.0$\mu$. In an advantageous embodiment of the invention, the calendered electroless copper-plated film is passed through an appropriate electrolytic bath for electrodeposition of the magnetic layer, preferably continuously at a speed of about 3 to 8 m./min., the discharge potential being advantageously kept below about 5 volts and the current density being less than 1 amp./dm.$^2$. The aqueous electrolyte containing the cobalt, nickel and copper or zinc and/or manganese salts is preferably maintained at a pH of from 4 to 5.5 by the addition of, say, ammonia or amine. The concentrations of the salts in the electrolyte are chosen according to the desired composition of the magnetic layers to be deposited, phosphorus being preferably added to the electrolyte in the form of hypophosphites. Suitable metal salts for inclusion in the electrolyte are, for example, nickel sulfamate, nickel citrate, nickel chloride, nickel(II) sulfate, cobalt chloride, cobalt(II) sulfate, copper chloride, copper sulfate, iron(II) sulfate, zinc sulfate, manganese(II) chloride and similar water-soluble metal salts. It is often advantageous to add minor quantities of ammonium salts such as ammonium chloride, water-soluble amines such as triethanolamine, metal-complex-forming compounds such as citrates, tartrates and aminocarboxylic acid, and/or non-ionic wetting agents such as addition products of ethylene oxide and long-chain fatty acids or alcohols or alkyl phenols. Suitable electroplating baths may be readily determined by simple experiment.

The process of the invention makes it possible, as large-scale trials have shown, to manufacture high-quality metal-plated magnetic recording media having a high storage capacity in an economical manner either continuously or semi-continuously. The resulting magnetic recording media have very good characteristics as regards coercive force, residual magnetism and saturation. They exhibit surprisingly high mechanical stability and cause virtually no head wear. In these respects they are distinctly superior to prior art metal-plated magnetic recording media. The magnetic recording media produced by the process of the invention are also distinguished by a long life.

The flexible magnetic recording media produced by the invention are eminently suitable for the manufacture of highly abrasion-resistant rigid recording media by lamination to rigid non-magnetizable bases such as plates and discs of, for example, aluminum, aluminum alloys, brass, glass, paper and ceramics, such lamination being effected by means of an adhesive. In general, the adhesives used are polymeric adhesives or pressure-sensitive adhesives in a solid, dissolved or dispersed form producing strong bonds between the base film and the rigid base, for example epoxy resin adhesives, adhesives based on polyol/polyisocyanate, acrylic ester polymers and copolymers and copolymers of ethylene with from 1 to 20% by weight (based on the total amount of monomers) of polymerized units of tertbutyl acrylates or methacrylates. Rigid metal-plated memories produced in this manner are particularly advantageous when used in data-processing systems.

The invention is further illustrated by the following examples in which parts and percentages are by weight unless otherwise stated. Parts by volume bear the same relation to parts by weight as the liter to the kilogram.

EXAMPLE 1

A polyethylene terephthalate web having a width of 650 mm. and a thickness of 15$\mu$ is coated with a dispersion of an iron powder having an average particle size of 0.3$\mu$ in a solution in tetrahydrofuran of a mixture of equal proportions by weight of a partially saponified vinyl chloride/vinyl acetate copolymer and the reaction product of 3 moles of toluylenediisocyanate and 1 mole of 1,1,1-trimethylolpropane. The amount of iron in the dried coating is 72% and the thickness of the dried coating is from 3 to 4$\mu$.

The surface of the coating is improved by passing the coated web between steel and paper rolls, by which process the peak-to-valley depth, as measured in a Perthometer using a diamond needle (radius "$\mu$) at a speed of 10$\mu$/sec., is reduced from 1.3 to 0.4$\mu$.

The calendered film is then passed through aqueous copper sulfate solutions acidified with sulfuric acid to effect electroless deposition of copper, all of the iron being replaced by copper. The electrical resistance of the resulting copper layer is 0.08 ohm/cm., when measured on a specimen having a width of 6.25 mm. at an electrode spacing of 10 cm.

The thus copper-plated sheeting is passed at room temperature, while still moist, between several pairs of steel rolls to calender the copper layer, by which process the peak-to-valley depth is reduced to less than one quarter of its original value.

The film with the calendered copper interlayer is immediately electroplated at a speed of 5 m./min. in an aqueous electrolyte containing, per 1,000 parts by volume of aqueous medium, 20 parts of nickel metal in the form of nickel sulfamate, 10 parts of cobalt metal in the form of cobalt chloride, 0.3 part of copper metal in the form of copper sulfate, 3 parts of sodium hypophite, 25 parts of triethanolamine and 0.2 part of a stearic acid/ethylene oxide reaction product as non-ionic wetting agent, to provide the magnetic coating. The hydrogen ion concentration of the bath corresponding to pH 5.0 is maintained throughout the passage of a total of 2,000 m. of film by the addition of ammonia. The web of film is made the cathode and the anodes are of insoluble platinum. The residence time of the film in the electrolyte is about 8 minutes, the current density being 0.6 amp./dm.$^2$ and the discharge potential less than 5 volts. During the specified residence time, a magnetic layer having a thickness of approximately 0.6$\mu$ is obtained, it being composed of 59.05% of cobalt, 39.10% of nickel, 1% of copper and 0.85% of phosphorus. The deposition of the magnetic layer effects further measurable smoothing of the metal surface of the recording media and the final peak-to-valley depth of the magnetic layers is less than 0.1$\mu$.

The resulting magnetic tapes exhibit extremely high mechanical stability, have a very long life and cause no measurable head wear.

EXAMPLE 2

Example 1 is repeated except that the polyethylene terephthalate web used has a coating of a dispersion of 70% of very finely divided iron powder homogeneously dispersed in 30% of a binder consisting of 40 parts of polyvinyl chloride and 60 parts of the reaction product of pentaerithritol triglycidyl ether and 3,3-dimethyl-4,4'-diaminodicyclohexylmethane.

This iron-containing coating having a thickness of 4$\mu$ is calendered by passing it between several pairs of rolls (steel and polyamide), the peak-to-valley depth of the coating being reduced to 0.4$\mu$.

The coating is then copper-plated by electroless deposition as described in Example 1, and the resulting copper interlayer is calendered with pairs of rolls (steel and polyamide), the peak-to-valley depth of the copper interlayer being reduced to less than one quarter of its original value.

The magnetic layer is then deposited electrolytically as described in Example 1. The electrolyte used contains, per 1,000 parts by volume of aqueous medium, 20 parts of nickel metal in the form of nickel citrate, 8 parts of cobalt metal in the form of cobalt chloride, 0.4 part of zinc in the form of zinc sulfate, 10 parts of ammonium chloride, 30 parts of triethanolamine, 1 part of sodium hypophosphite and 0.2 part of the reaction product of 1 mole of tallow fatty alcohol and 30 moles of ethylene oxide as non-ionic wetting agent. During electroplating, the pH of the bath is maintained at from 4.6 to 5.0, the discharge potential at less than 5 volts and the current density at 0.8 amp./dm.$^2$, and the conducting web which is made the cathode is subjected to the action of the electric current applied via platinum/rhodium anodes for 10 minutes. The magnetic layer obtained has a thickness of 0.35$\mu$ and is composed of 50% of nickel, 49% of cobalt, 0.5% of phosphorus and 0.5% of zinc.

These magnetic layers also exhibit extremely high mechanical stability and abrasion-resistance and very good recording properties.

EXAMPLE 3

A polyethylene terephthalate web is provided with a coating having a thickness of 4$\mu$ and consisting of a substantially homogeneous dispersion of 75 parts of zinc powder having an average particle size of less than 1.5$\mu$, 2 parts of stearic acid, 8 parts of polyvinylidene chloride in a binder based on 8 parts of 1,1,1-trimethylolpropane, 3,4 parts of hexamethylene diisocyanate and 3.6 parts of toluylene diisocyanate. The surface of the coating is improved by repeated passage between pairs of rolls (steel and paper) at a temperature of up to 75° C. and a pressure of approximately 10 kg./cm.$^2$, the original peak-to-valley depth of 1.7$\mu$ being reduced to 0.6$\mu$.

The resulting zinc-coating calendered coating is then treated in strongly acidic copper salt baths (pH=2) to effect electroless copper deposition until a coherent copper layer having an electrical resistance of 0.08 ohm/cm. is obtained. This layer is calendered between pairs of rolls (steel and paper) to reduce the peak-to-valley depth of the conducting copper layer to about 0.1$\mu$.

The magnetic layer is then deposited electrolytically as described in Example 1. There are obtained magnetic layers exhibiting high abrasion resistance and capable of withstanding high mechanical stresses and causing only minimum wear in computer storage devices.

EXAMPLE 4

A polyethylene terephthalate web is coated with an iron/binder dispersion to form a coating having a thickness of about 4$\mu$, the dispersion being prepared from 70% of iron powder showing a high degree of sub-division and having an average particle size of about 0.2$\mu$, 1.5% of stearic acid, 13% of polyvinyl chloride and 15.5% of the reactive paint (as binder) of a copolymer of 65% of n-butyl acrylate, 20% of 1,4-butanediol monoacrylate and 15% of tert-butyl acrylate to which 6.8% of hexamethylene diisocyanate has been added.

The coated web is passed through a series of acidic copper salt baths (pH=2) to effect electroless displacement of all of the iron powder in the coating by copper, which copper becomes adhesively deposited both within the binder in the coating and on the surface thereof. The electrical resistance of the resulting copper layer, as measured on a specimen having a width of 6.25 mm. at an electrode spacing of 10 cm., is 0.18 ohm/cm.

The copper-plated web is then passed through an acidic copper bath and the copper layer which is made the cathode is thickened by the electrolytic deposition of a copper layer having a thickness of 0.8$\mu$, the current density being 0.1 amp/dm.$^2$.

The surface of the copper layer on the sheeting is then calendered by passage between several pairs of rolls (steel and polyamide), the peak-to-valley depth being reduced to about 0.1$\mu$. This calendered, thickened copper interlayer now forms the substrate for the magnetic layer of nickel/cobalt/copper to be subsequently deposited electrolytically.

To this end, the copper-plated web is passed through baths containing, per 1,000 parts by volume of aqueous medium, 20 parts of nickel metal in the form of nickel citrate, 8 parts of cobalt metal in the form of cobalt chloride, 0.7 part of copper metal in the form of copper sulfate, 3 parts of sodium hypophosphite, 40 parts of triethanol amine, 0.2 part of the reaction product of 1 mole of stearic acid and about 25 moles of ethylene oxide as non-ionic wetting agent and 5 parts of ammonium chloride. Electroplating is effected at a current density of 0.5 amp/dm.$^2$, a discharge potential of less than 5 volts, an electrolyte pH of 5.3 and a speed of 6 m./min. The residence time of the various lengths of film in the bath is adjusted to about 10 minutes. The magnetic layers are deposited in a thickness of 0.8$\mu$ and consist of 62% of cobalt, 36.5% of nickel, 0.5% of copper and 0.95% of phosphorus.

These magnetic recording media also exhibit high mechanical stability and no measurable wear in computer storage devices and video recorders.

EXAMPLE 5

Example 1 is repeated except that maintenance of the pH of the bath during electrodeposition of the magnetic layer is effected not with ammonia but with triethanolamine with replenishment of the metal salts consumed. There are obtained magnetic recording media which, compared with those made according to Example 1, have lower values of saturation, as a result of which the squareness ratio is improved.

We claim:

1. In a process for the manufacture of abrasion-resistant magnetic recording media by depositing a thin magnetizable metal layer based on cobalt and nickel on a thin metallic interlayer which has been applied to a flexible non-magnetizable substrate, the improvement comprising taking a substrate which has been provided with an adherent coating consisting of a dispersion of finely divided iron or zinc having a mean particle size of from 0.1 to 2$\mu$ in a binder, in which the metal content is at least 50% by weight, and treating said coated substrate in an aqueous copper salt bath so as to effect deposition of copper in exchange for the iron or zinc, calendering said copper layer to obtain a metal surface having a low degree of surface roughness and electrolytically depositing on said calendered metallic layer by means of insoluble anodes a thin magnetic layer comprising a magnetizable alloy of from 90 to 20% by weight of cobalt and from 10 to 80% by weight of nickel and containing, based on the total weight of cobalt and nickel, from 0.1 to 1.5% by weight of phosphorous and from 0.05 to 2% by weight of copper or, instead of copper, from 0.05 to 5% by weight of zinc or manganese or both.

2. A process as claimed in claim 1, wherein the electrodeposited magnetizable alloy additionally contains 0 to 10% by weight of iron.

3. A process as claimed in claim 1, wherein the metal-containing adherent coating is calendered before being subjected to copper deposition.

4. A process as claimed in claim 1, wherein the copper layer is thickened by electrolytic deposition of copper or silver.

5. A process as claimed in claim 1, wherein the insoluble anodes used are platinum anodes or platinum/rhodium anodes.

6. A process as claimed in claim 1, wherein calendering of the iron-containing or zinc-containing layer copper layer is effected by passing the coated flexible substrate between rolls under pressure.

7. A process as claimed in claim 1, wherein the resulting flexible magnetic recording media are laminated to rigid non-magnetizable bases such as plates and discs by means of a layer of adhesive.

References Cited

UNITED STATES PATENTS 3,098,803 7/1963 Godycki et al. ---- 204—38 B

HOWARD S. WILLIAMS, Primary Examiner
R. L. ANDREWS, Assistant Examiner

156—150; 204—43, 44, 46, 52